United States Patent
Gordon

[11] 3,839,050
[45] Oct. 1, 1974

[54] BROILER AND BARBECUER

[76] Inventor: Arthur E. Gordon, 902 Data St., Truth or Consequences, N. Mex. 87901

[22] Filed: Sept. 25, 1973

[21] Appl. No.: 400,657

[52] U.S. Cl. .............................. 99/345, 99/421 H
[51] Int. Cl. ............................................ A47j 37/10
[58] Field of Search ..................... 99/345, 339–340, 99/346–347, 355, 419–420, 421, 426–427; 126/25

[56] References Cited
UNITED STATES PATENTS

| | | | |
|---|---|---|---|
| 504,256 | 8/1893 | Strong | 99/345 |
| 809,851 | 1/1906 | Scott | 99/421 H X |
| 2,682,830 | 7/1954 | Kupchik | 99/421 H X |
| 2,760,428 | 8/1956 | Boyajian | 99/427 |

*Primary Examiner*—Peter Feldman
*Assistant Examiner*—Arthur O. Henderson
*Attorney, Agent, or Firm*—Herman L. Gordon

[57] ABSTRACT

A portable cooking device consisting of a housing having a hinged ventilated top section containing an electric heating element. The bottom section of the housing has a longitudinal rotary square shaft with spaced apertures. A grid containing food to be broiled or cooked is detachably secured on the shaft by means of resilient U-shaped food-impaling clips having pointed legs spaced to be received in the shaft apertures, the clips engaging around portions of the grid wires to hold the grid and its contents on the shaft. Below the shaft the bottom section contains a removable pan for basting sauce, located so that a portion of the food can be dipped in the sauce by rotating the shaft. The shaft may be rotated either manually by a crank or by means of an electric motor coupled to the shaft.

10 Claims, 6 Drawing Figures

3,839,050

BROILER AND BARBECUER

This invention relates to cooking appliances, and more particularly to a portable broiler and barbecuer.

A main object of the invention is to provide a novel and improved portable appliance for broiling or barbecuing food, the appliance being relatively simple in construction, being easy to operate, and providing a basting action while an article of food is being cooked therein.

A further object of the invention is to provide an improved broiler and barbecuer which is inexpensive to manufacture, which is safe to use, which is durable in construction, and which is easy to clean.

A still further object of the invention is to provide an improved electric food broiler and barbecuer which is relatively compact in size, which is neat in appearance, and which has a high degree of versatility of use.

A still further object of the invention is to provide an improved portable electric food broiler and barbecuer which is suitable either for outdoor or indoor use, which is arranged so that food articles can be easily and securely removably mounted therein for cooking, which is provided with an easily accessible container for basting sauce or the like, and which has efficient means for dipping a food article in the basting sauce while the article is being cooked.

A still further object of the invention is to provide an improved portable electric food broiler and barbecuer which includes rotary support means for a food article and a container for basting sauce or the like below the rotary support means located so that the food article may be dipped in the sauce by rotating the support means, the device having highly efficient and sanitary means for removably securing the food article to the rotary support means.

Further objects and advantages of the invention will become apparent from the following description and claims, and from the accompanying drawings, wherein:

Figure 1:
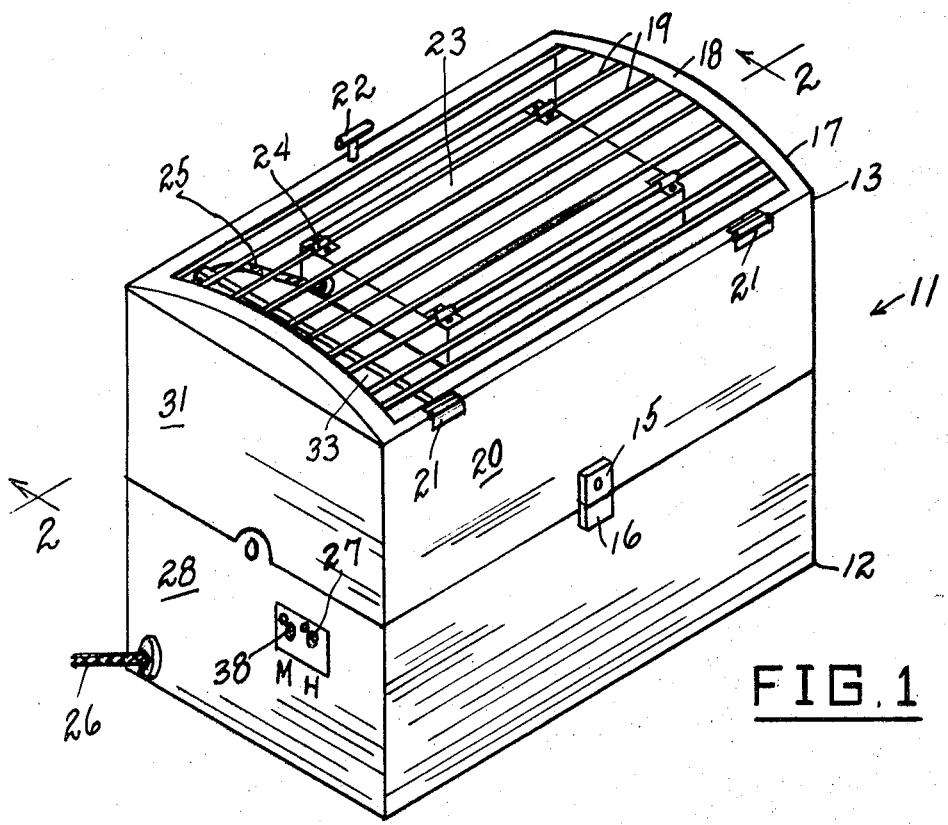
FIG. 1 is a perspective view of an improved portable electric broiler and barbecuer constructed in accordance with the present invention.

Referring to the drawings, 11 generally designates a typical embodiment of a cooking appliance constructed in accordance with the present invention. The appliance 11 comprises a generally rectangular housing having a bottom section 12 and an upper section 13 hinged to said bottom section at a longitudinal side of the housing, as shown at 14. At its opposite side, the meeting longitudinal edge portions of the housing sections are provided with a conventional manually releasable latch assembly comprising the cooperating components shown at 15 and 16.

The top wall of upper housing section 13 comprises a hinged ventilating grating assembly 17 including a rectangular frame 18 in which are secured spaced longitudinally extending grating rods 19. The frame 18 is hingedly connected to the front longitudinal vertical wall 20 of the upper housing section by conventional hinges 21, 21, as shown in FIG. 1. At its opposite longitudinal margin the ventilating grating assebly 17 is provided with an upstanding T-shaped handle 22.

Figure 2:
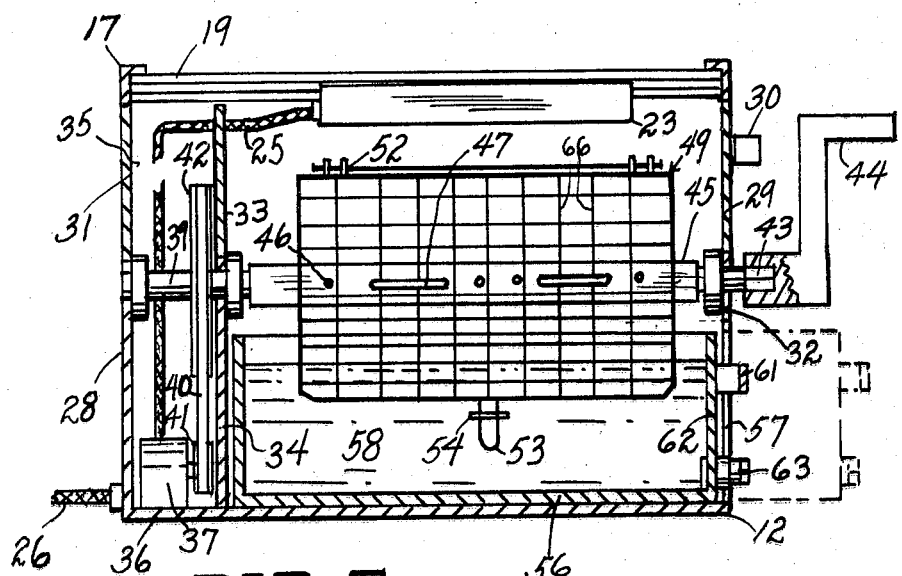
FIG. 2 is a longitudinal vertical cross-sectional view taken substantially on the line 2-2 of FIG. 1, with the grate portion thereof shown in a substantially vertical position such that a food article carried thereby may be dipped in basting sauce.
Figure 3:
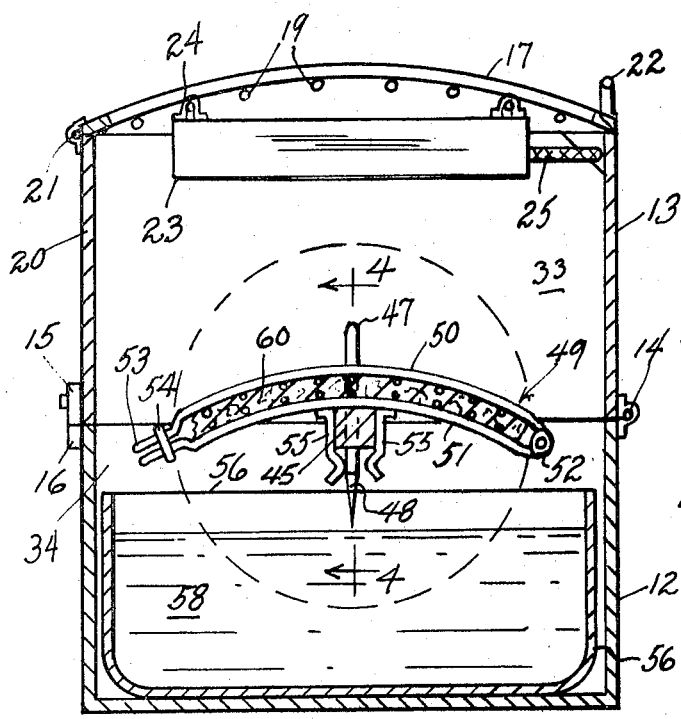
FIG. 3 is an enlarged transverse cross-sectional view taken through the device of FIG. 1, with the grate portion thereof in a substantially horizontal position.

A downwardly-facing generally rectangular heating element 23, similar to a conventional hot plate, is secured at its corner portions to their nearby adjacent rods 19 by suitably channelled fastening brackets 24 so as to support the heating element 23 in a downwardly facing position in the upper portion of the housing, as shown in FIGS. 2 and 3. Heating element 23 is provided with a flexible energizing cable 25 which is connected to the main power supply cable 26 of the appliance through a suitable control switch 27 mounted on a transverse end wall 28 of the lower housing section 12.

Upper housing section 13 has the opposite transverse end walls 29 and 31. Transverse end wall 29 is provided with a handle 30.

Lower housing section 12 has the opposite transverse end walls 28 and 32. Secured transversely in upper section 13 and lower section 12 are the respective registering partition wall elements 33 and 34 spaced from the end walls 31 and 28 to define a motor compartment 35. Mounted on the bottom wall 36 of lower housing section 12 in said compartment is a small slow-speed electric motor 37 which is connected to the main power supply cable 26 through a suitable control switch 38 mounted on end wall 28.

A longitudinally extending shaft 39 is centrally journalled in the top marginal portions of end wall 28, partition wall 34, and end wall 32 of lower housing section 12. Shaft 39 is drivingly coupled to motor 37 by a V-belt 40 which engages on a small V-grooved pulley 41 on the motor shaft and a large V-grooved pulley 42 on shaft 39. The opposite end of shaft 39 is provided with a squared stud 43, shown in FIG. 6, which may be at times drivingly engaged by a removable hand crank 44.

Figure 4:
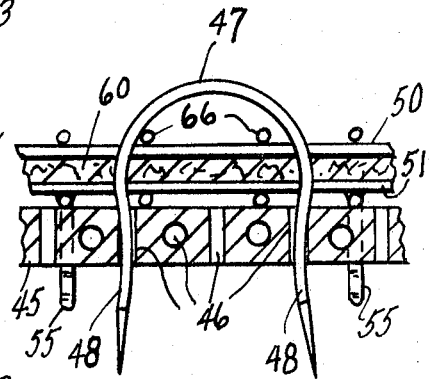
FIG. 4 is an enlarged fragmentary vertical cross-sectional view taken substantially on the line 4—4 of FIG. 3.
Figure 6:
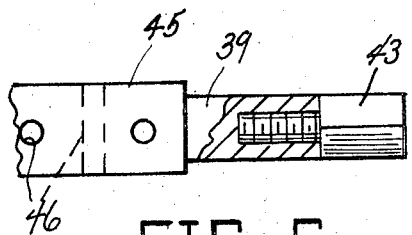
FIG. 6 is an enlarged fragmentary elevational view, partly in cross-section, of the crank end of the rotary food-supporting shaft of the device of FIG. 1.

Shaft 39 has a squared major portion 45 extending substantially for the major portion of the longitudinal distance between the transverse wall elements 34 and 32. Squared shaft portion 45 is formed with two sets of regularly spaced transverse apertures 46, one series of apertures being transverse to the other series of apertures and being spaced midway therebetween, as shown in FIGS. 4 and 6. A plurality of U-shaped resilient fastening clips 47 are provided, with arcuately curved convexly opposing sharpened impalement prongs 48,48 spaced substantially by an integral multiple of the distance between the apertures 46 so as to be engageable simultaneously through two apertures 46,46 of squared shaft portion 45, as shown in FIG. 4. The curvature of the prongs 48 is preferably sufficient to provide a resilient wedging cooperation with the apertures 46 when the prongs are engaged in the apertures substantially in the manner shown in FIG. 4, requiring a substantial upward manual pulling force to disengage the resilient fastening clips from the squared shaft portion.

Designated at 49 is a generally arcuately curved grate assembly having arcuately curved upper and lower wire grate panels 50 and 51 hinged together at one side edge of the grate assembly, as shown at 52, and centrally provided at their opposite edges with retention loops 53 over which a retention ring 54 may be engaged, as shown in FIGS. 2 and 3. The lower grate panel 51 is centrally provided with a plurality of pairs of opposing depending spring clip arms 55,55 lockingly engageable around the squared shaft portion 45 in the manner shown in FIG. 3.

As shown in FIG. 3, the grate assembly 49 is of sufficient transverse width so that a substantial portion thereof will sweep through the lower portion of housing section 12 when shaft 39 is rotated, as will be presently described.

Designated at 56 is a pan for basting sauce or the like, which is shaped to slidably fit in the lower housing section 12 in the space between transverse wall elements 34 and 32, the end wall element 32 being formed with a large opening 57 of sufficient size to allow pan 56 to slide in and out of the lower housing section. The pan is adapted to contain a quantity of basting sauce 58 or the like, with the pan filled to a sufficient height so that a food article 60 contained in the grate assembly 49 will be dipped in the sauce as shaft 39 rotates, for example, when the grate assembly 49 rotates toward and from an upright position such as that shown in FIG. 2.

Figure 5:
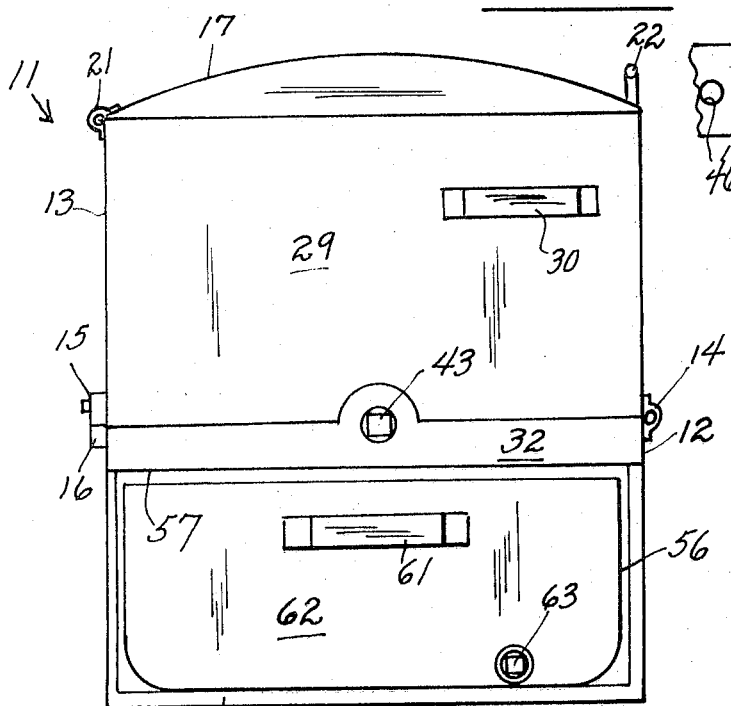
FIG. 5 is an enlarged rear end elevational view of the device of FIG. 1.

The rear end wall 62 of pan 56 is provided with a handle 61 and with a removable drain plug 63, as shown in FIGS. 2 and 5.

The driving connection between motor 37 and shaft 39, comprising V-belt 40 and pulleys 41 and 42, and the friction of the motor shaft act as a yieldable holding means to retain the grate assembly 49 in a stationary position once it has been adjusted thereto. Thus, the shaft 39 may be manually rotated by means of crank 44, with motor 37 deenergized, so that the food-basting action is performed manually. After basting, the grate assembly 49 may be set to a substantially horizontal position, such as that shown in FIG. 3, allowing the upper side of the food article 60 to be exposed to the downwardly-facing heating element 28. After a desired period of time, the grate assembly may be rotated through 180° to expose the other side of the food article to the heating element. As the grate assembly is reversed, the food article dips into the basting sauce 58.

Alternatively, the hand crank 44 may be removed and the motor 37 may be energized by closing switch 38. The grate assembly 49 carrying the food article 60 then rotates slowly in a continuous manner, providing the above-described basting action continuously during the cooking period.

In operation, a food article 60 is placed between the upper and lower panels 50 and 51 of the grate assembly 49 and is locked therebetween by engaging the locking ring 54 around the loops 53. The assembly 49 is then snapped onto the squared shaft portion 45 by engaging the pairs of locking clips 55,55 over the squared shaft portion, as shown in FIG. 3. The assembly is then secured on the squared shaft portion by employing a plurality of U-shaped impalement clips 47 in the manner above described, with one or more of the transverse wires 66 of the upper grate panel 50 received beneath the bight portions of the clips 47 in the manner illustrated in FIG. 4, and the prongs 48,48 engaged through a pair of shaft apertures 46. As above mentioned, the prongs are in resilient wedging cooperation with the apertures 46 and firmly secure the grate assembly and the impaled food article 60 to the squared shaft portion, reinforcing the holding action of the pairs of opposed locking fingers 55,55.

With a sufficient quantity of basting sauce 58 in the pan 56, the heating element may then be energized by closing switch 27. After a sufficient cooking temperature has been reached, the motor 37 may be energized by closing switch 38, causing the grate assembly 49 and food article 60 to be rotated in the manner above described. Alternatively, the grate assembly 49 and food article 60 may be rotated manually by employing the hand crank 44.

After the required cooking period, the appliance is deenergized, and the housing is opened, providing access to the grate assembly 49. The impalement clips 47 may then be pulled out and the grate assembly 49 may be then detached from the squared shaft portion 45. The grate assembly 49 may then be opened and the cooked food article removed.

While a specific embodiment of a cooking appliance has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A cooking appliance comprising a bottom housing section having upstanding longitudinal side walls and transverse end walls, one wall being provided with an opening, a pan for basting sauce in said housing and being slidable at times through said opening, a downwardly-facing upper housing section hingedly connected at one edge portion thereof to an edge portion of the bottom housing section so as to define a cooking enclosure with respect thereto, said upper section having a ventilated top wall, a downwardly-facing heating element in said upper housing section secured to said ventilated top wall, a shaft journalled horizontally in opposite walls of the bottom housing section, rotary driving means connected to said shaft, a grate assembly adapted to receive a food article, said shaft being formed with a plurality of longitudinally spaced apertures, and at least one U-shaped resilient impalement clip having resilient legs spaced to engage around and over a portion of the grate assembly and to be received in said apertures, whereby to detachably secure said grate assembly with a food article therein to said shaft, said grate assembly being of sufficient width to enter said pan when the shaft is rotated, whereby to dip into basting sauce contained in said pan to provide a basting action.

2. The cooking appliance of claim 1, and wherein said grate assembly comprises a pair of grate panels hinged together at side edges thereof and provided with means to releasably secure the opposite side edges together.

3. The cooking appliance of claim 1, and wherein said shaft is formed with a portion of substantially square cross-sectional shape, said longitudinally spaced apertures being located in said square shaft portion.

4. The cooking appliance of claim 3, and wherein the resilient legs of the U-shaped impalement clip are arcuately curved and resiliently and wedgingly engage in said apertures.

5. The cooking appliance of claim 4, and wherein the resilient legs of the clip are oppositely convexly curved relative to each other.

6. The cooking appliance of claim 5, and wherein said grate assembly is provided with a plurality of longitudinally aligned pairs of opposed resilient gripping fingers shaped to lockingly receive said square shaft portion therebetween.

7. The cooking appliance of claim 6, and wherein said grate assembly is transversely arcuately curved and said gripping fingers are located at the concave side of the grate assembly and are located to secure the grate assembly longitudinally over said square shaft portion.

8. The cooking appliance of claim 7, and wherein said shaft is provided with an external non-circular end portion, and a hand crank shaped to drivingly engage at times with said non-circular end portion.

9. The cooking appliance of claim 7, and wherein said housing sections are provided with cooperating means defining an auxiliary compartment, said rotary driving means comprising an electric motor mounted in said auxiliary compartment, and means drivingly coupling said motor to said shaft.

10. The cooking appliance of claim 9, and wherein said ventilated top wall is hingedly connected to the top portion of said upper housing section.

* * * * *